(12) United States Patent
Bourdon et al.

(10) Patent No.: US 7,802,075 B2
(45) Date of Patent: Sep. 21, 2010

(54) SYNCHRONIZED HIGH-ASSURANCE CIRCUITS

(75) Inventors: Albert J. Bourdon, Solana Beach, CA (US); Gary G. Christensen, Vista, CA (US); Sean K. O'Keeffe, Arlington, VA (US); John R. Owens, Carlsbad, CA (US)

(73) Assignee: ViaSat, Inc., Carlsbad, CA (US)

( * ) Notice: Subject to any disclaimer, the term of this patent is extended or adjusted under 35 U.S.C. 154(b) by 135 days.

(21) Appl. No.: 11/428,516

(22) Filed: Jul. 3, 2006

(65) Prior Publication Data

US 2007/0113230 A1    May 17, 2007

Related U.S. Application Data

(60) Provisional application No. 60/697,071, filed on Jul. 5, 2005, provisional application No. 60/697,072, filed on Jul. 5, 2005.

(51) Int. Cl.
    *G06F 11/14* (2006.01)
(52) U.S. Cl. ........................ 712/34
(58) Field of Classification Search ............ 712/34
    See application file for complete search history.

(56) References Cited

U.S. PATENT DOCUMENTS

| | | | |
|---|---|---|---|
| 5,255,367 A * | 10/1993 | Bruckert et al. | 714/11 |
| 5,751,932 A | 5/1998 | Horst et al. | |
| 5,845,060 A | 12/1998 | Vrba et al. | |
| 5,896,523 A | 4/1999 | Bissett et al. | |
| 6,065,135 A | 5/2000 | Marshall et al. | |
| 6,067,633 A * | 5/2000 | Robbins et al. | 714/1 |
| 6,279,119 B1 * | 8/2001 | Bissett et al. | 714/12 |
| 6,356,795 B1 | 3/2002 | Barthel et al. | |
| 6,363,464 B1 | 3/2002 | Mangione | |
| 6,434,712 B1 | 8/2002 | Urban et al. | |
| 6,665,700 B1 * | 12/2003 | Sugisaki et al. | 718/104 |
| 7,107,484 B2 | 9/2006 | Yamazaki et al. | |
| 2001/0044912 A1 | 11/2001 | Francis et al. | |
| 2003/0140255 A1 | 7/2003 | Ricchetti et al. | |
| 2005/0120218 A1 | 6/2005 | Echizen et al. | |

FOREIGN PATENT DOCUMENTS

EP    0674262 A    9/1995

OTHER PUBLICATIONS

DeConinck, Geert et al., The EFTOS Approach to dependability in embedded supercomputing, IEEE Transactions on Reality, Mar. 2002, vol. 51, Issue 1, p. 76-90, Posted online: Aug. 7, 2002, URL:http://www.esat.kuleuven.be/electa/publications/fulltexts/pub_884.pdf.

Supplementary European Search Report for European Application No. EP06786509 dated Dec. 16, 2009, 5 pages.

* cited by examiner

*Primary Examiner*—Eddie P Chan
*Assistant Examiner*—Robert Fennema
(74) *Attorney, Agent, or Firm*—Townsend and Townsend and Crew LLP

(57) ABSTRACT

A high-assurance system for processing information is disclosed. The high-assurance system comprising first and second processors, a task matching circuit, and first and second outputs. The task matching circuit configured to determine a software routine is ready for execution on the first processor, and delay the first processor until the second processor is ready to execute the software routine. The first output of the first processor configured to produce a first result with the software routine. The second output of the second processor configured to produce a second result with the software routine, where the first result is identical to the second result.

24 Claims, 5 Drawing Sheets

SYNCHRONIZED HIGH-ASSURANCE CIRCUITS

This application claims the benefit of and is a non-provisional of both U.S. Provisional Application Ser. No. 60/697,072 filed on Jul. 5, 2005; and U.S. Provisional Application Ser. No. 60/697,071 filed on Jul. 5, 2005, which are both assigned to the assigner hereof and hereby expressly incorporated by reference in their entireties for all purposes.

This application is related to all of U.S. patent application Ser. No. 11/428,520, filed Jul. 3, 2006, entitled "TRUSTED CRYPTOGRAPHIC SWITCH"; U.S. patent application Ser. No. 11/428,505, filed Jul. 3, 2006, entitled "TRUSTED CRYPTOGRAPHIC PROCESSOR"; and U.S. patent application Ser. No. 11/428,508, filed Jul. 3, 2006, entitled "TASK MATCHING FOR COORDINATED CIRCUITS", which are all assigned to the assigner hereof and hereby expressly incorporated by reference in their entirety for all purposes.

BACKGROUND

This disclosure relates in general to high-assurance processing and, but not by way of limitation, to redundant circuits used in cryptographic processing.

Some cryptosystems today use microprocessors. Often redundancy is used to assure proper operation of the cryptosystem. Microprocessors may be implemented redundantly. To assure they operate in synchronization, the microprocessors may be run in lock-step fashion such that they perform their execution in unison. Should one processor vary its operation from the other, a comparison function would find the problem.

Under many circumstances, the same processors working in unison will eventually drift apart. Power conservation circuits can throttle-back sub-circuits to save power and/or prevent overheating. Interrupts can often be asynchronous received. Out-of-order execution can also cause unpredictability in the processing flow of microprocessors. These and other factors make some microprocessor designs unsuitable for lock-step operation.

Lock-step designs require circuits that match very closely to prevent one from getting out of synchronization with another. Synchronizers are used to align events that occur at different times. Where circuits cannot be matched or are changed during repair, the lock-step design may no longer operate in synchronization.

For lock-step operation, the software on all mirrored microprocessors must execute together, which requires the same software execution on the microprocessors. Some software tasks are appropriate for lock-step operation, while others do not require that level of harmonization. Redundant execution of all software wastes resources on routines that have no need for harmonization.

SUMMARY

In one embodiment, the present disclosure provides a high-assurance system for processing information. The high-assurance system comprising first and second processors, a task matching circuit, and first and second outputs. The task matching circuit configured to determine a software routine is ready for execution on the first processor, and delay the first processor until the second processor is ready to execute the software routine. The first output of the first processor configured to produce a first result with the software routine. The second output of the second processor configured to produce a second result with the software routine, where the first result is identical to the second result.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The present disclosure is described in conjunction with the appended figures.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment. It being understood that various changes may be made in the function and arrangement of elements without departing from the spirit and scope as set forth in the appended claims.

Figure 1A:
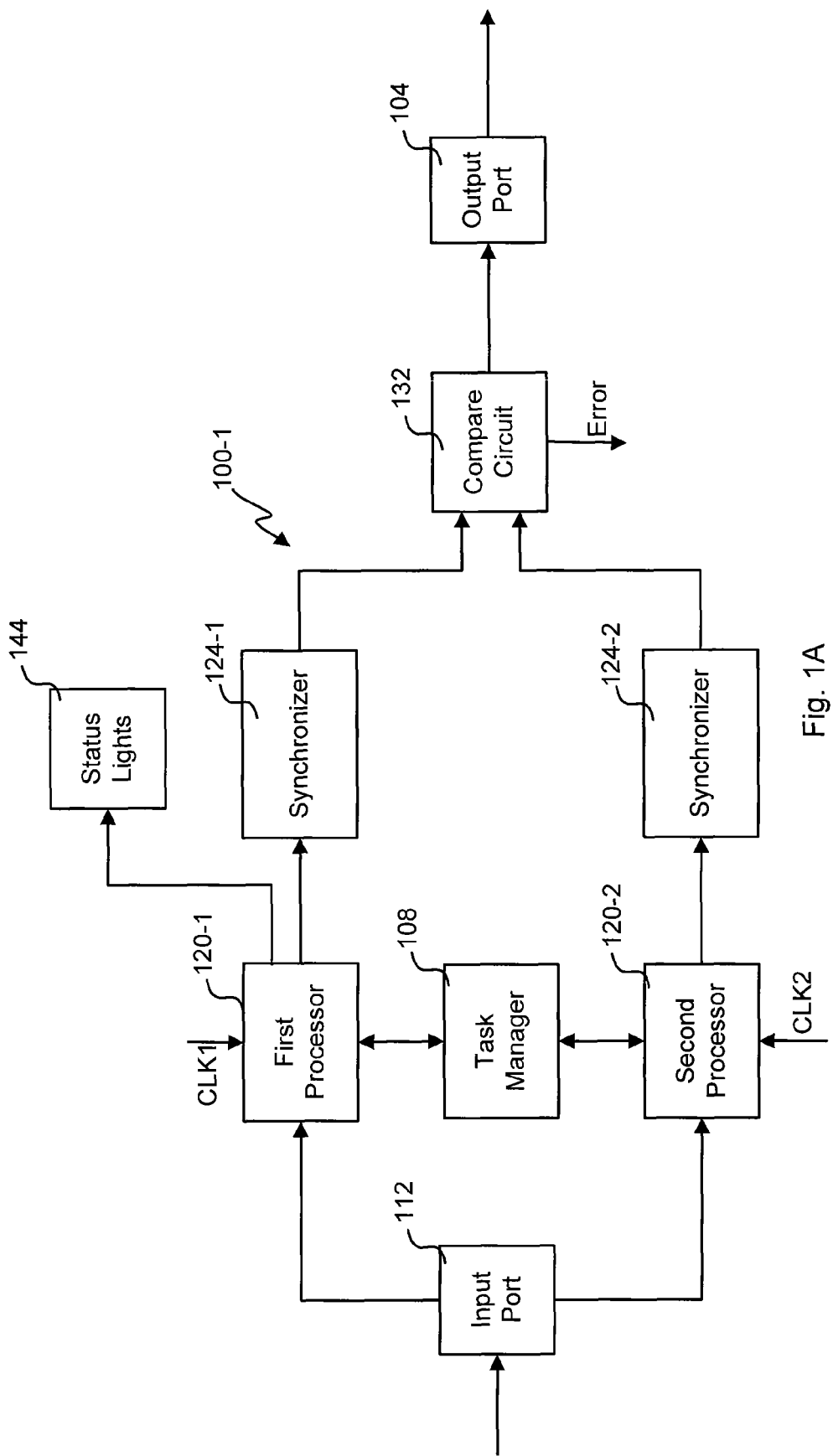
FIGS. 1A and 1B depict block diagrams of embodiments of a redundant processing system.

Referring first to FIG. 1A, a block diagram of an embodiment of a redundant processing system 100-1 is shown. This embodiment uses two processors 120 that synchronize on occasion for high-assurance tasks, but may be out of synchronization at other times when other tasks are being performed. The block diagram is simplified in that only a few blocks are shown that demonstrate high-assurance tasks and a low-assurance task. A task is any discrete function, routine, snippet, applet, program, or process that can be implemented in software and/or hardware. In this example, servicing the input and output ports is high-assurance, but operating status lights is low-assurance. When performing high-assurance tasks, redundant processing is performed where the results are compared to assure a match. Even though this embodiment only shows two redundant sub-circuits, other embodiments could have any number of redundant sub-circuits, e.g., four, six, eight, etc.

High-assurance tasks include servicing an input and output ports 112, 104. The input port 112 receives information that is redundantly sent to a first processor 120-1 and a second processor 120-2 for processing. The processing could include formatting, validity checks, cryptographic processing, etc. The processors 120 could be of the same or a similar configuration. In this embodiment, the clocks for the processors 120 are not synchronized and could run at different speeds. For example, the first processor 120 could run faster or more efficiently to allow for extra low-assurance tasks to be serviced such as servicing the status lights 144. When running the same high-assurance tasks, the processors 120 could disable further interrupts to avoid one or both processors 120 from wandering away from the current task and risking a loss of synchronization.

A task manager 108 is used in this embodiment to allow coordinating pursuit of high-assurance tasks by ensuring that each processor performs the shared high-assurance tasks in the same order. These processors may have other tasks interspersed between the shared tasks. One of the processors 120 initiates a high-assurance task and notifies the task manager 108 who makes sure the other processor 120 is ready to initiate the same high-assurance task. When both processors 120 are ready, the task manager 108 notifies both to begin execution.

An example can illustrate the task synchronization process. A message is received on the input port and both processors 120 are interrupted to gather and process the message. The first processor 120-1 to execute its interrupt service routine (ISR) would get to the point of notifying the task manager 108. Presumably, the other processor 120-2 is getting to a similar point in its respective ISR. The task manager 108 would hold the first processor 120-1 to wait for the second processor 120-2. The second processor 120-2 could be prompted by the task manager 108 to cycle through all potential tasks until the one indicated by the first processor 120-1 matches. The task manager 108 would coordinate both processors 120 in beginning to execute the same task. Although this embodiment does not require lock-step processing of high-assurance tasks, other embodiments could use lock-step processing when executing high-assurance tasks.

Although the task manager should assure that both processors 120 work the same task in the same order, the results can be out of time synchronization. Synchronizers 124 in this embodiment can realign the output from each processor and/or reduce the risk of metastability when going from one clock domain to another. In one embodiment, the synchronizer 124 for each processor 120 produces results in synchronization by buffering results from the processor and aligning those results or forgiving any misalignment. In one embodiment, the task manager 108 could allow the processors 120 coordinate writing out information such that alignment issues are reduced. This embodiment of the synchronizer would still reduce the risk of metastability when crossing clock domains.

The compare circuit 132 checks that the results produced after synchronization match before sending a result to the output port 104. Where there is no match an error is produced and the result is not sent to the output port 104. Some embodiments of the compare circuit 132 may allow the results from each synchronizer 124 to be one or more clock cycles out of sync when performing the comparison without producing an error.

Figure 1B:
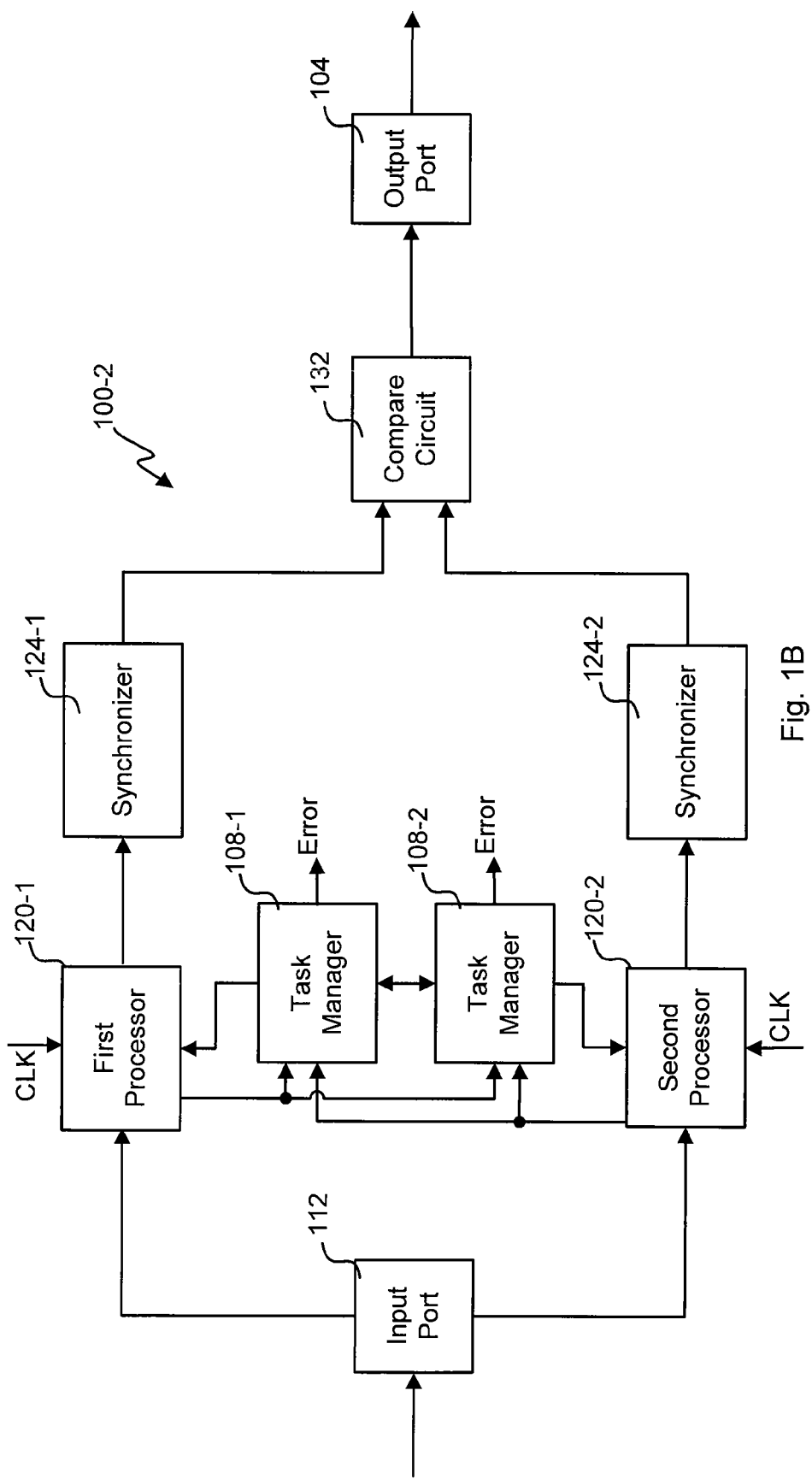

With reference to FIG. 1B, a block diagram of another embodiment of a redundant processing system is shown. This embodiment has two task managers 108 that are used to achieve redundancy in the task management function. Each processor 120 responds to its respective task manager 108-1, 108-2, who then coordinate aligning the task execution. In this embodiment, the two processors 120 could be different designs or clocked at different frequencies such that lock-step synchronization is not realized. The task managers 108 keep the processors 120 task aligned for some high-assurance tasks despite any differences in the processors 120. Should the task managers 108 disagree at some point, an error would be produced. Comparison circuits could, for example, be used to check the output of the task managers 108. The synchronized task output comparator 132 acts as in FIG. 1A.

Figure 2A:
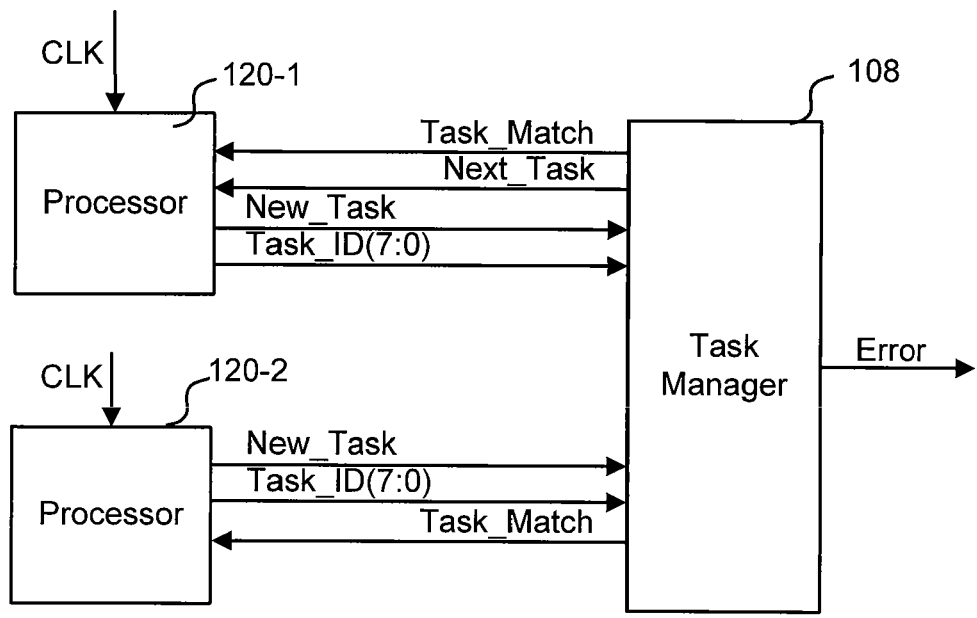
FIGS. 2A, 2B and 2C depict block diagrams of embodiments of a task management circuit interacting with two processors.

Referring next to FIG. 2A, a block diagram of an embodiment of a task management circuit 108 interacting with two processors 120 is shown. Only a single task manager 108 is used in this embodiment, but other embodiments could use redundant task managers. In this embodiment, the second processor 120-2 initiates task synchronizations as a master of the process and the first processor 120-1 acts as a slave.

For a high-assurance task, the second processor 120-2 activates the New_Task signal. The task manager 108 reads the Task_ID value from the second processor 120-2. Activation of the New_Task signal and writing the Task_ID is coded into the task routine run on the second processor 120-2. This embodiment uses an eight bit value to indicate the task identifier, but other embodiments could use a 16-bit, 32-bit value or any other sized value. The Task_ID is unique to a particular high-assurance task run on both processors 120.

With the Task_ID, the task manager 108 activates the Next_Task signal to ask the first processor 120-1 to indicate the next task queued for execution. The first processor activates its New_Task signal to indicate validity of a Task_ID. Where there is no match of both Task_IDs, the task manager 108 asks the first processor to move to the next task by activation of the Next_Task signal. Should the two Task_IDs match or correspond, however, the Task_Match signals are activated. This would signal to both processors 120 to begin to execute the same task indicated by the Task_IDs. If no task match is produced within a pre-determined time or number of trials, the processor would discard that task from its queue and continue in one embodiment.

Figure 2B:
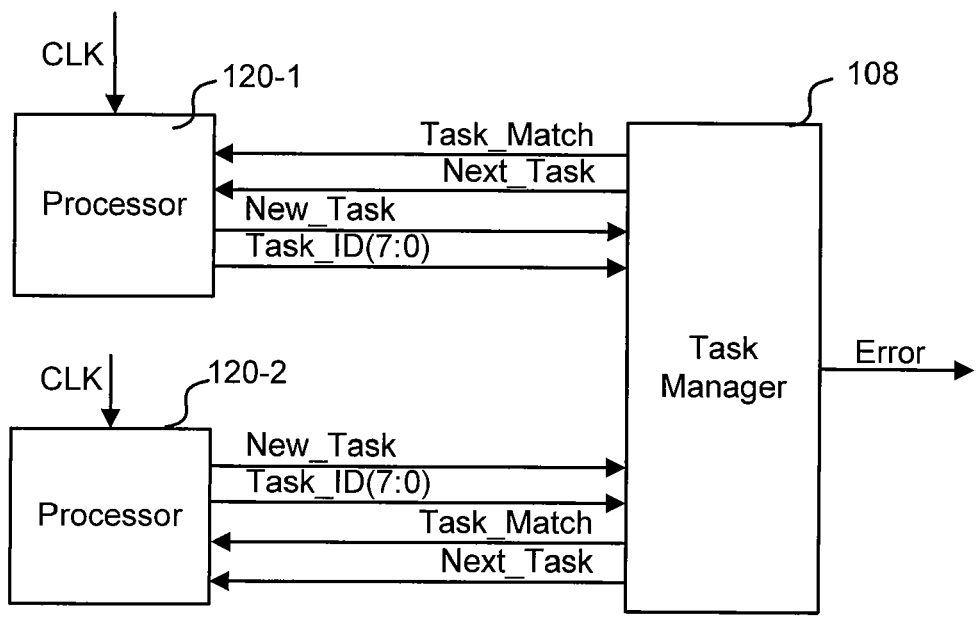

With reference to FIG. 2B, a block diagram of another embodiment of a task management circuit 108 interacting with two processors 120 is shown. In this embodiment, either processor can initiate a task synchronization. The first to initiate would act as the master of the process and the other processor would act as the slave. The task manager 108 would work with the master processor 120 until matching tasks are found and executed before allowing another initiation of the task matching process. Alternative embodiments could redundantly implement the task manager 108 and still allow dynamically assigning the master of the process. Disagreement between redundant task managers 108 would be recognized as an error.

Figure 2C:
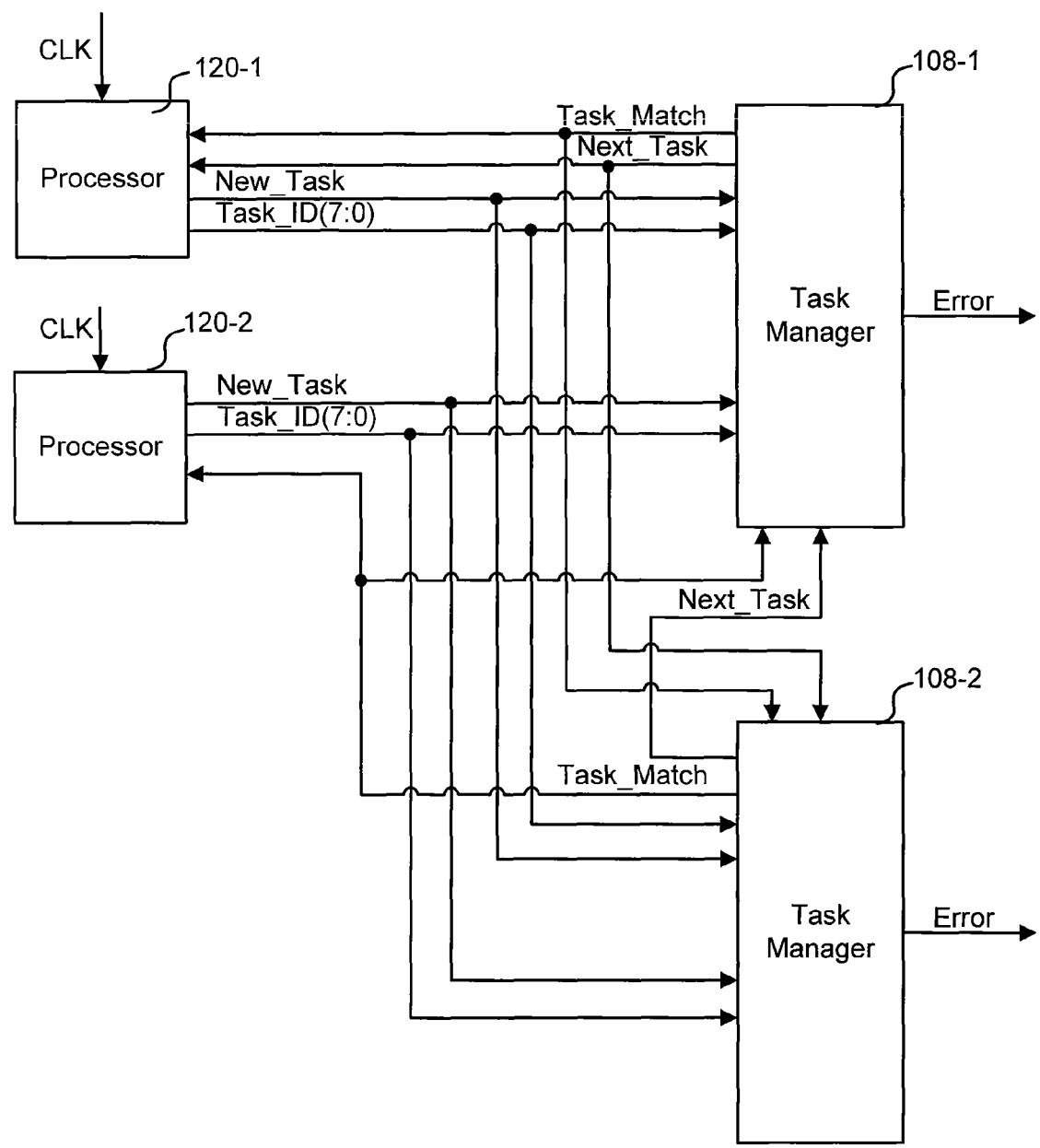

With reference to FIG. 2C, a block diagram of an embodiment of redundant task management circuits 108 interacting with two processors 120 is shown. This embodiment utilizes redundancy in the task management circuits 108 to provide high-assurance. Both task management circuits 108 compare tasks and report task incrementing and matching tasks to each other. Where the two task managers 108 are not in agreement, an error is generated. In the depicted embodiment, second processor 120-2 acts as a master and the first processor acts as a slave in the process of synchronizing execution of a high-assurance task. The first processor is directly manipulated by the first task manager 108-1, and the second processor is directly manipulated the second task manager 108-2.

Figure 3:
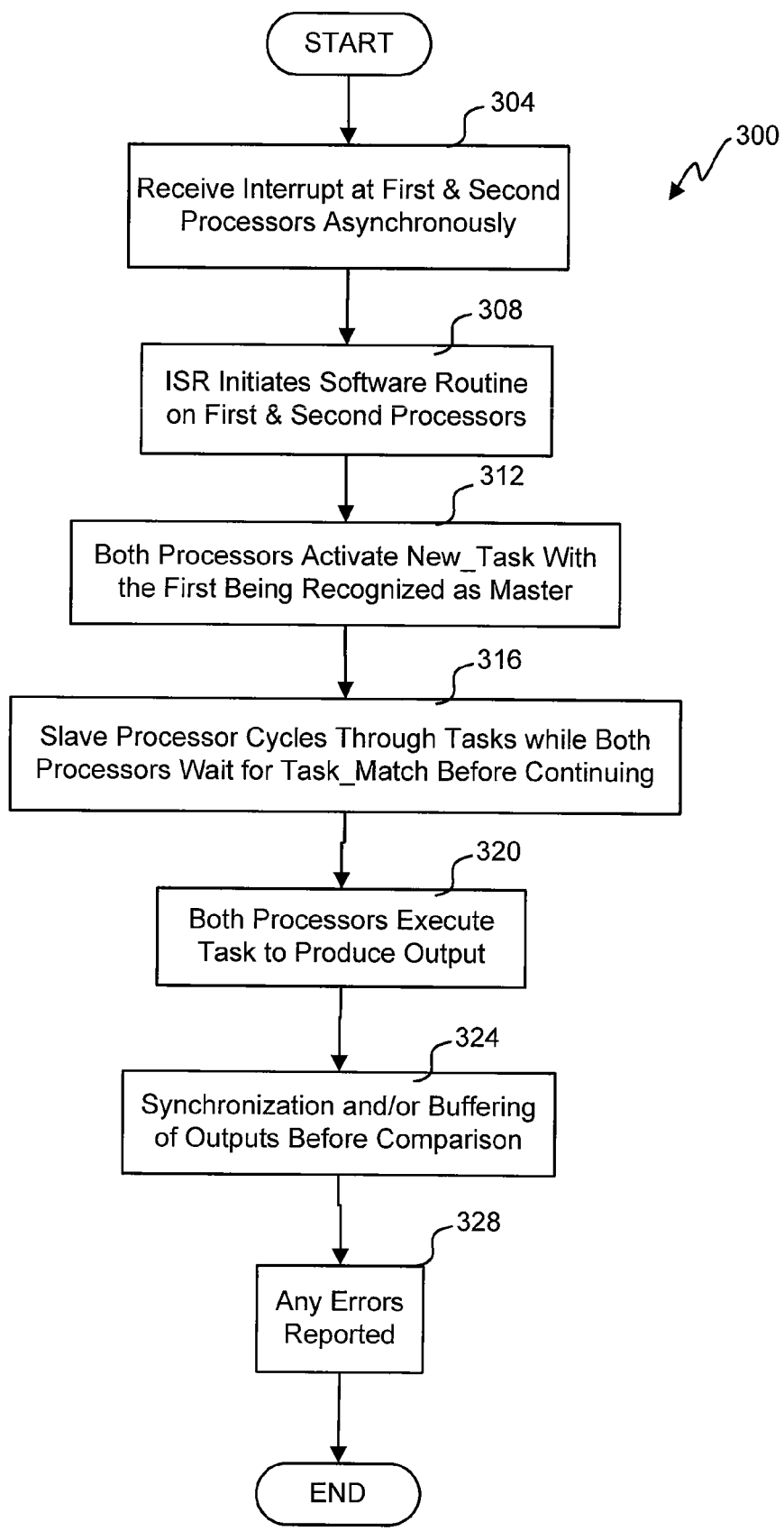
FIG. 3 illustrates a flowchart of an embodiment of a process for aligning processing of some tasks on two circuits.

Referring next to FIG. 3, a flowchart of an embodiment of a process for aligning processing of some tasks on two circuits is shown. The depicted portion of the process begins in block 304 where the first and second processors 120 receive an interrupt to perform some sort of high-assurance task. Alternatively, the processors 120 could poll a register to determine when a high-assurance task should be initiated. An ISR indicated by the interrupts is started on both processors 120. The two processors 120 may start processing the interrupts at different times in block 308. Further, processing could be rearranged or interrupted such that both processors 120 are not performing the same actions at the same time.

In this embodiment, both processors could potentially be the master initiating the task matching process, but only one is allowed to master the process. Where both activate their respective New_Task lines simultaneously, the task manager 108 could arbitrarily, randomly or repeatedly pick one of the two to be the master. In block 312, one or both processors 120 activate the New_Task line and one is recognized as master. In block 316, the slave processor 120 is tested to determine if the Task_ID matches with the master processor 120. Where there is no match, the slave processor cycles through tasks as Next_Task is activated successively. At some point in block 316, Task_Match goes active to indicate that both processors 120 have the same Task_ID at the top of their execution queue.

With matching Task_IDs, Task_Match signals to both processors that they should start execution of the high-assurance task in block 320 and produce an output of some sort. The operation of the processors 120 may or may not be in lockstep during execution of the high-assurance task. Some, all or low-priority interrupts may be disabled during execution of the high-assurance task to control the interrupts tolerated. Synchronization and/or buffering may or may not be done on the output before comparing the outputs from both processors 120. Any errors are handled and reported in block 328.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels, and/or various other mediums capable of storing, containing or carrying instruction(s) and/or data.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

For a software implementation, the techniques, processes and functions described herein may be implemented with modules (e.g., procedures, functions, and so on) that perform the functions described herein. The software codes may be stored in memory units and executed by processors. The memory unit may be implemented within the processor or external to the processor, in which case the memory unit can be communicatively coupled to the processor using various known techniques.

While the principles of the disclosure have been described above in connection with specific apparatuses and methods, it is to be clearly understood that this description is made only by way of example and not as limitation on the scope of the disclosure.

What is claimed is:

1. A high-assurance system for processing information, the high-assurance system comprising:
   a first processor configured to receive a first task interrupt that identifies a first high-assurance software routine to be processed by the first processor;
   a second processor configured to receive a second task interrupt that identifies a second high-assurance software routine, corresponding to the first high-assurance software routine, to be processed on the second processor, and to add the second high-assurance software routine to a task queue of tasks to be processed by the second processor;
   a hardware task matching circuit configured to:
      receive a first task identifier from the first processor and determine, based on a value of the first task identifier, that the first high-assurance software routine is ready for execution on the first processor,
      receive a plurality of second task identifiers from the second processor, each of the plurality of second task identifiers indicating a next software routine in the task queue to be processed by the second processor,
      cause the second processor to cycle through at least one of the tasks in the task queue, without the second processor processing at least one of the software routines associated with at least one of the tasks in the task queue, until receiving one of the plurality of second task identifiers that corresponds to the second high-assurance software routine, and
      delay the first processor until receiving the second task identifier corresponding to the second high-assurance software routine from the second processor, indicating that the second processor is ready to execute the second high-assurance software routine;

a first output of the first processor configured to produce a first result with the first high-assurance software routine; and a second output of the second processor configured to produce a second result with the second high-assurance software routine, wherein the first result is identical to the second result and the first and second processors are embodied in hardware.

2. The high-assurance system for processing information as recited in claim 1, wherein the first processor is different in design and operation from the second processor.

3. The high-assurance system for processing information as recited in claim 1, wherein:

the first processor operates off a first clock signal at a first frequency;

the second processor operates off a second clock signal at a second frequency; and the first frequency is different from the second frequency.

4. The high-assurance system for processing information as recited in claim 1, wherein the software routine includes a plurality of program instructions.

5. The high-assurance system for processing information as recited in claim 1, wherein the first result is produced at a different time than the second result.

6. The high-assurance system for processing information as recited in claim 1, further comprising a synchronizing circuit configured to align the first and second result in time.

7. The high-assurance system for processing information as recited in claim 1, further comprising a comparison circuit configured to compare the first result to the second result.

8. A processing method for high-assurance applications executed on redundant processors, the processing method comprising:

providing a first processing circuit;

providing a second processing circuit, wherein the first processing circuit is capable of executing software out of synchronization with the second processing circuit during normal operation;

detecting a task check is initiated;

determining a software routine that correlates to the task check;

receiving a first task identifier from the first processing circuit;

receiving a plurality of second task identifiers from the second processing circuit, one of the plurality of second task identifiers corresponding to the software routine;

confirming, based on values of the first task identifier and the second task identifier corresponding to the software routine, that both the first processing circuit and the second processing circuit are ready to perform the software routine, at least in part, simultaneously in time;

causing the second processing circuit to cycle through at least one of a plurality of tasks in a task queue, without the second processing circuit processing at least one software routine associated with at least one of the plurality of tasks, until receiving the second task identifier corresponding to the software routine;

delaying execution of the software routine by the first processing circuit until the second processing circuit is ready to execute the software routine;

producing a first result from the first processing circuit with the software routine; and producing a second result from the second processing circuit with the software routine, wherein the first and second results are identical.

9. The processing method for high-assurance applications executed on redundant processors as recited in claim 8, further comprising a step of checking that the first result matches the second result.

10. The processing method for high-assurance applications executed on redundant processors as recited in claim 8, further comprising a step of buffering at least one of the first and second results until they are available for readout in a time-synchronous manner.

11. The processing method for high-assurance applications executed on redundant processors as recited in claim 8, further comprising a step of comparing the first and second results in a bitwise fashion.

12. The processing method for high-assurance applications executed on redundant processors as recited in claim 8, further comprising a step of producing an error when the first and second results are different.

13. The processing method for high-assurance applications executed on redundant processors as recited in claim 8, wherein the task check is only received for a subset of the software routines.

14. The processing method for high-assurance applications executed on redundant processors as recited in claim 8, wherein the software routine includes a plurality of program instructions.

15. The processing method for high-assurance applications executed on redundant processors as recited in claim 8, further comprising a step of synchronizing in time the first and second results.

16. The processing method for high-assurance applications executed on redundant processors as recited in claim 8, wherein execution of the software routine by the first processing circuit is asynchronous with execution of the software routine by the second processing circuit on an instruction-to-instruction basis.

17. The processing method for high-assurance applications executed on redundant processors as recited in claim 8, wherein producing steps produce the first result and second results a plurality of clock cycles apart in time.

18. A high-assurance system for processing information, the high-assurance system comprising:

a first circuit;

a second circuit;

a hardware task matching circuit configured to:

receive a first task identifier from the first circuit, receive a plurality of second task identifiers from the second circuit;

determine, based on a value of the first task identifier, that a function is ready to be performed on the first circuit, cause the second circuit to cycle through a plurality of functions in a task queue, without the second circuit processing at least one function indicated by at least one of the plurality of second task identifiers, until receiving one of the second task identifiers indicating that the second circuit is ready to execute the function ready to be performed on the first circuit; and delay the first circuit until the second circuit is ready to execute the function;

a first output of the first circuit configured to produce a first result with the function;

a second output of the second circuit configured to produce a second result with the function, wherein the first result is determinable from the second result; and a compare circuit coupled to the first and second circuits and configured to analyze the first and second results to determine if they correspond, wherein the first and second circuits are embodied in hardware.

19. The high-assurance system for processing information as recited in claim 18, wherein the first circuit includes a processor and the second circuit does not include a processor.

20. The high-assurance system for processing information as recited in claim 18, wherein the first and second results are identical.

21. The high-assurance system for processing information as recited in claim 18, wherein:

the first circuit operates off a first clock signal at a first frequency;

the second circuit operates off a second clock signal at a second frequency; and the first frequency is different from the second frequency.

22. The high-assurance system for processing information as recited in claim 18, wherein the function comprises a plurality of program instructions.

23. The high-assurance system for processing information as recited in claim 18, wherein the first result is produced at a different time than the second result.

24. The high-assurance system for processing information as recited in claim 18, further comprising a synchronizing circuit configured to align the first and second result in time.

\* \* \* \* \*